United States Patent
Hwang et al.

(10) Patent No.: US 11,622,284 B2
(45) Date of Patent: Apr. 4, 2023

(54) PHYSICAL DOWNLINK CONTROL CHANNEL DESIGN FOR NR SYSTEMS

(71) Applicant: MEDIATEK INC., Hsin-Chu (TW)

(72) Inventors: Chien-Hwa Hwang, Hsin-Chu (TW); Chien-Chang Li, Hsin-Chu (TW); Yi-Ju Liao, Hsin-Chu (TW); Pei-Kai Liao, Hsin-Chu (TW); Weidong Yang, San Jose, CA (US)

(73) Assignee: MediaTek INC., Hsin-Chu (TW)

( * ) Notice: Subject to any disclaimer, the term of this patent is extended or adjusted under 35 U.S.C. 154(b) by 339 days.

(21) Appl. No.: 16/926,864

(22) Filed: Jul. 13, 2020

(65) Prior Publication Data
US 2020/0344616 A1    Oct. 29, 2020

Related U.S. Application Data

(63) Continuation of application No. 15/927,226, filed on Mar. 21, 2018, now Pat. No. 10,757,581.
(Continued)

(51) Int. Cl.
*H04L 5/00* (2006.01)
*H04W 16/28* (2009.01)
(Continued)

(52) U.S. Cl.
CPC ........... *H04W 16/28* (2013.01); *H04L 1/1861* (2013.01); *H04L 5/0053* (2013.01);
(Continued)

(58) Field of Classification Search
CPC . H04W 16/28; H04W 72/042; H04W 72/046; H04W 74/08; H04L 1/1861;
(Continued)

(56) References Cited

U.S. PATENT DOCUMENTS

| 2005/0111398 A1 | 5/2005 | Wybenga et al. ............ 370/328 |
| 2009/0097447 A1 | 4/2009 | Han et al. .................... 370/330 |

(Continued)

FOREIGN PATENT DOCUMENTS

| CN | 101816158 A | 10/2007 |
| CN | 103312649 A | 3/2012 |

(Continued)

OTHER PUBLICATIONS

EPO, search report for the EP patent application 18772612.0 dated Jun. 9, 2020 (16 pages).

(Continued)

*Primary Examiner* — Minh Trang T Nguyen
(74) *Attorney, Agent, or Firm* — Imperium Patent Works; Zheng Jin

(57) ABSTRACT

A new design for physical downlink control channel (PDCCH) is proposed for the next generation 5G new radio systems. A UE receives the configuration of a default control resource set (CORESET) in MIB/SIB from its serving base station. The default CORESET contains both common search space and UE-specific search space for candidate PDCCH transmission. A PDCCH in a default CORESET is mapped to physical resource in a distributed or localized manner. Specifically, various REG-to-CCE mapping rules are proposed to improve frequency diversity gain, or frequency selectivity gain, or to reduce latency of PDCCH processing. Further, to facilitate analog beamforming in mmWave systems, the default CORESET is transmitted in a synchronization signal (SS) block associated with a corresponding analog beam direction.

10 Claims, 4 Drawing Sheets

Related U.S. Application Data

(60) Provisional application No. 62/474,696, filed on Mar. 22, 2017.

(51) Int. Cl.
*H04W 72/044* (2023.01)
*H04L 1/1829* (2023.01)
*H04W 72/04* (2023.01)
*H04W 74/08* (2009.01)
*H04B 7/06* (2006.01)

(52) U.S. Cl.
CPC ....... *H04W 72/042* (2013.01); *H04W 72/046* (2013.01); *H04W 74/08* (2013.01); *H04B 7/0617* (2013.01); *H04L 5/0037* (2013.01); *H04L 5/0048* (2013.01)

(58) Field of Classification Search
CPC ... H04L 5/0053; H04L 5/0037; H04L 5/0048; H04L 5/0094; H04L 5/0023; H04B 7/0617
See application file for complete search history.

(56) References Cited

U.S. PATENT DOCUMENTS

| | | | |
|---|---|---|---|
| 2013/0114525 A1 | 5/2013 | Ahmadi | 370/329 |
| 2015/0085802 A1 | 3/2015 | Papasakellariou et al. | H04W 72/042 |
| 2015/0098409 A1 | 4/2015 | Li et al. | 370/329 |
| 2015/0270931 A1 | 9/2015 | Sun et al. | 370/329 |
| 2016/0242149 A1 | 8/2016 | Batra et al. | 370/329 |
| 2018/0219606 A1* | 8/2018 | Ng | H04L 5/0048 |

FOREIGN PATENT DOCUMENTS

| | | |
|---|---|---|
| CN | 103457688 A | 5/2012 |
| CN | 105763294 A | 12/2014 |
| WO | WO2013070918 A1 | 11/2011 |
| WO | WO2014067488 A1 | 11/2012 |
| WO | WO2017030601 A1 | 8/2015 |

OTHER PUBLICATIONS

R1-1701585 3GPP TSG RAN WG1 Meeting #88, ZTE et al., "NR DL Control Channel Structure", Athens, Greece, Feb. 13-17, 2017 (8 pages) *sections 1-3; figure 3*.

R1-1701950 3GPP TSG RAN WG1 meeting 88, Guangdong OPPO Mobile Telecom, "On NR PDCCH Structure and CCE-PRB Mapping", Athens, Greece, Feb. 13-17, 2017 (7 pages) *sections 2.1 and 2.2*.

R1-1701636 3GPP TSG RAN WG1 Meeting #88, Huawei et al., "Demodulation RS Design for DL Control Channel", Athens, Greece, Bef. 13-17, 2017 (4 pages) *section 2.1; figure 2.2*.

R1-1611461 3GPP TSG RAN WG1 Meeting #87, Fujitsu, "Discussion on PRACH", Reno, USA, Nov. 14-18, 2016 (5 pages) *section 2.3; figure 4*.

R1-1700620 3GPP TSG RAN WG1 AH_NR Meeting, NTT DOCOMO, Inc., "Monitoring of DL control channel for NR", Spokane, USA, Jan. 16-20, 2017 (7 pages) *sections 2 and 3*.

SIPO, search report for the CN patent application 201880003628.3 (No. English translation is available) dated Dec. 29, 2020 (8 pages).

R1-1701585 3GPP TSG RAN WG1 Meeting #88, ZTE et al., "NR DL Control Channel Structure", Athens, Greece, Feb. 13-17, 2017 (8 pages) *sections 1-3*.

International Search Report and Written Opinion of International Search Authority for PCT/CN2018/079949 dated May 15, 2018 (12 pages).

EPO, office action for the EP patent application 18772612.0 dated Mar. 30, 2020 (15 pages).

IPO India, Examination report for application 201927041951 dated May 7, 2021.

R1-1701585 3GPP TSG RAN WG1 Meeting #88, ZTE et al., "NR DL Control Channel Structure", Athens, Greece, Feb. 13-17, 2017 (8 pages) *sections 2-3*.

* cited by examiner

PHYSICAL DOWNLINK CONTROL CHANNEL DESIGN FOR NR SYSTEMS

CROSS REFERENCE TO RELATED APPLICATIONS

This application is a continuation, and claims priority under 35 U.S.C. § 120 from nonprovisional U.S. patent application Ser. No. 15/927,226, entitled "Physical Downlink Control Channel Design for NR Systems", filed on Mar. 21, 2018, the subject matter of which is incorporated herein by reference. Application Ser. No. 15/927,226, in turn, claims priority under 35 U.S.C. § 119 from U.S. Provisional Application No. 62/474,696 entitled "Design of Physical Downlink Control Channel (PDCCH)" filed on Mar. 22, 2017, the subject matter of which is incorporated herein by reference.

TECHNICAL FIELD

The disclosed embodiments relate to Physical Downlink Control Channel (PDCCH) design, and more specifically, to PDCCH design and resource allocation in next generation 5G new radio (NR) mobile communication networks.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred as user equipments (UEs). Enhancements to LTE systems are considered so that they can meet or exceed International Mobile Telecommunications Advanced (IMT-Advanced) fourth generation (4G) standard. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for dynamic downlink scheduling.

A plurality of physical resource blocks (PRBs) is allocated for PDCCH transmission that carry downlink control information (DCI). In order to decode PDCCH targeted specifically to a UE, the UE needs to find out where its PDCCH is. In the so-called "blindly" decoding process, the UE must try a number of candidate PDCCHs before knowing which PDCCH is targeted for itself. The allocated radio resources of the candidate PDCCHs may be distributed or localized. In addition, the PDCCHs may constitute a common search space (CSS) or a UE-specific search space (UESS). As a result, supporting both distributed and localized PDCCH transmission in both common and UE-specific search spaces for each UE may result in excessive control signaling and increased number of blind decoding.

The signal bandwidth for next generation 5G new radio (NR) systems is estimated to increase to up to hundreds of MHz for below 6 GHz bands and even to values of GHz in case of millimeter wave (mmWave) bands. Furthermore, the NR peak rate requirement can be up to 20 Gbps, which is more than ten times of LTE. Three main applications in 5G NR system include enhanced Mobile Broadband (eMBB), Ultra-Reliable Low Latency Communications (URLLC), and massive Machine-Type Communication (MTC) under milli-meter wave technology, small cell access, and unlicensed spectrum transmission. Multiplexing of eMBB & URLLC within a carrier is also supported. Specifically, the mmWave frequency spectrum between 3G and 300G Hz is explored for the next generation broadband cellular communication networks. The mmWave wireless network uses directional communications with narrow beams and can support multi-gigabit data rate. Directional antenna can be implemented by phased array with many antenna elements. Analog beamforming and spatial multiplexing methods can be applied in multiple antenna systems.

A solution to improve the design of PDCCH structure and to support analog beamforming, COMP, and MU-MIMO in PDCCH design is sought.

SUMMARY

A new design for physical downlink control channel (PDCCH) is proposed for the next generation 5G new radio systems. Each PDCCH is associated with a set of control channel elements (CCEs) for PDCCH transmission. Each CCE consists of a number of resource element groups (REGs) based on an REG-to-CCE mapping rule, and each REG is indexed by a frequency first or by a time first REG indexing manner. A UE receives the configuration of a default control resource set (CORESET) in MIB/SIB from its serving base station. The default CORESET contains both common search space and UE-specific search space. A PDCCH in a default CORESET is mapped to physical resource in a distributed or localized manner. Specifically, various REG-to-CCE mapping rules are proposed to improve frequency diversity gain, or frequency selectivity gain, or to reduce latency of PDCCH processing. Further, to facilitate analog beamforming in mmWave systems, the default CORESET is transmitted in a synchronization signal (SS) block associated with a corresponding analog beam direction. UE reads the configuration of the default CORESET in the SS block of its favored analog beam direction and derives PRACH resource for channel access.

In one embodiment, a UE receives a control signal from a base station to determine a set of received physical resource blocks (PRBs) and a set of OFDM symbols that carry downlink control information. The UE determines a set of candidate physical downlink control channels (PDCCHs) within the set of PRBs. Each PDCCH is associated with a set of control channel elements (CCEs) for PDCCH transmission. The UE collects a plurality of resource element groups (REGs) for each CCE. Each CCE consists of a number of REGs based on a REG-to-CCE mapping, and each REG is indexed by a frequency first or by a time first REG indexing manner. The UE decodes the downlink control information that are mapped to the collected REGs.

In another embodiment, a UE receives one or more synchronization signal blocks (SS blocks) from a base station. Each SS block is associated with a corresponding analog beam direction. The UE obtains a default control resource set (CORESET) in an SS block and determining a corresponding UE-favored analog beam direction. The default CORESET comprises a set of physical resource blocks (PRBs), a set of OFDM symbols, a numerology, a periodicity, and reference signal (RS) configuration. The UE obtains a physical random-access channel (PRACH)

resource associated with the default CORESET. The UE performs an access procedure over the obtained PRACH resource.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3A illustrates a first embodiment of PDCCH structure with frequency first REG indexing and distributed REG to CCE mapping.

FIG. 3B illustrates a second embodiment of PDCCH structure with frequency first REG indexing and localized REG to CCE mapping.

FIG. 3C illustrates a third embodiment of PDCCH structure with time first REG indexing and distributed REG to CCE mapping.

FIG. 3D illustrates a fourth embodiment of PDCCH structure with time first REG indexing and localized REG to CCE mapping.

DETAILED DESCRIPTION

Reference will now be made in detail to some embodiments of the invention, examples of which are illustrated in the accompanying drawings.

Figure 1:
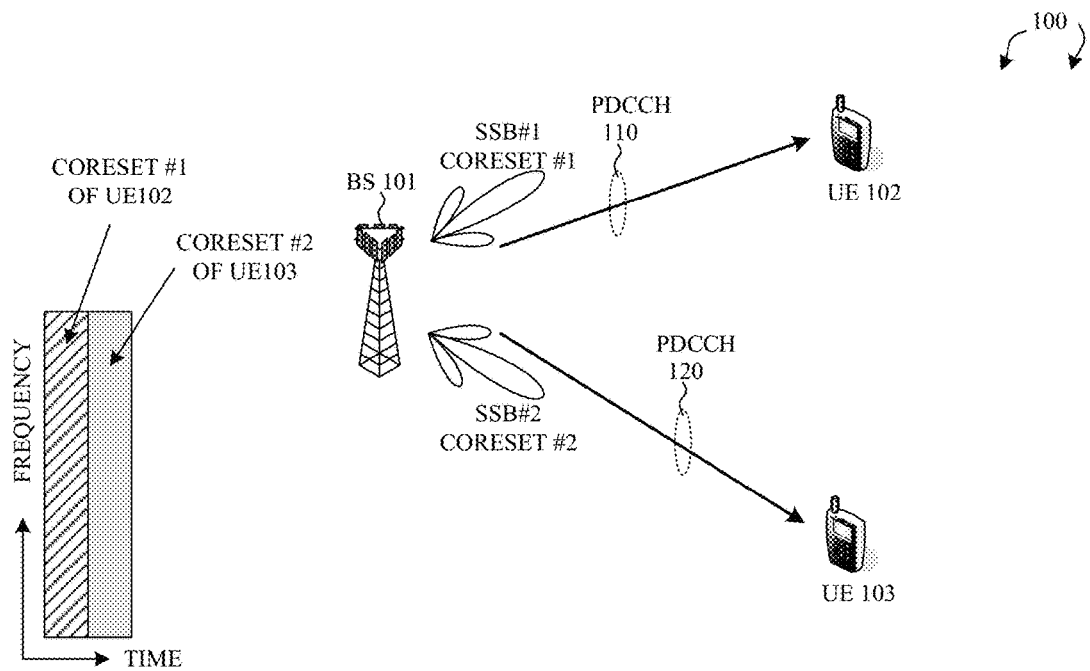
FIG. 1 illustrates a next generation new radio (NR) mobile communication network with control channel design in accordance with one novel aspect.

FIG. 1 illustrates a next generation new radio (NR) mobile communication network 100 with physical downlink control channel (PDCCH) design in accordance with one novel aspect. Mobile communication network 100 is an OFDM/OFDMA system comprising a serving base station BS 101 and a plurality of user equipment UE 102 and UE 103. When there is a downlink packet to be sent from the BS to the UE, each UE gets a downlink assignment, e.g., a set of radio resources in a physical downlink shared channel (PDSCH). When a UE needs to send a packet to the BS in the uplink, the UE gets a grant from the BS that assigns a physical uplink shared channel (PUSCH) consisting of a set of uplink radio resources. The UE gets the downlink or uplink scheduling information from a PDCCH that is targeted specifically to that UE. In addition, broadcast control information is also sent in the PDCCH. The downlink and uplink scheduling information and the broadcast control information, carried by the PDCCH, together is referred to as downlink control information (DCI).

In the example of FIG. 1, physical downlink control channels (PDCCHs) 110 and 120 are used for BS 101 to send DCI to UE 102 and UE 103, respectively. In 3GPP LTE system based on OFDMA downlink, the radio resource is partitioned into subframes, each of which is comprised of two slots and each slot has seven OFDMA symbols along time domain. Each OFDMA symbol further consists of a number of OFDMA subcarriers along frequency domain depending on the system bandwidth. The basic unit of the resource grid is called Resource Element (RE), which spans an OFDMA subcarrier over one OFDMA symbol. A physical resource block (PRB) occupies one slot and twelve subcarriers, while a PRB pair occupies two consecutive slots in one subframe. Each candidate PDCCH is associated with a set of control channel elements (CCEs) to potentially carry the DCI. The base station maps a plurality of resource element groups (REGs) to each CCE based on a REG-to-CCE mapping rule. The base station encodes the downlink control information over the set of CCEs to be transmitted to a UE if the DCI is intended for that UE.

Comparing to LTE numerology (subcarrier spacing and OFDM symbol length), in next generation 5G NR systems, multiple numerologies are supported and the radio frame structure gets a little bit different depending on the type of numerology. In addition, analog beamforming is supported for PDCCH transmission. However, the general operation of PDCCH transmission remains the same as the PDCCH transmission in LTE. In order to decode PDCCH targeted specifically to a UE, the UE needs to find out where its PDCCH is. In the so-called "blindly" decoding process, the UE must try a number of candidate PDCCHs before knowing which PDCCH is targeted for itself. The PDCCHs may constitute a common search space (CSS) for multiple UEs or a UE-specific search space (UESS) for a single UE.

In the example of FIG. 1, each UE receives the configuration of a default control resource set (CORESET) in MIB/SIB from the serving base station. UE 102 receives a default CORESET #1, and UE 103 receives a default CORESET #2 on the time-frequency radio resource grid. A default CORESET contains both common search space and UE-specific search space. A PDCCH in a default CORESET is mapped to physical resource in a distributed or localized manner. Specifically, various REG-to-CCE mapping rules are proposed to improve frequency diversity gain, or frequency selectivity gain, or to reduce latency of PDCCH processing. Further, to facilitate analog beamforming in mmWave systems, the default CORESET is transmitted in a synchronization signal block (SS Block) associated with a corresponding analog beam direction. For example, CORESET #1 is transmitted in SSB #1 associated a first beam direction to UE 102, and CORESET #2 is transmitted in SSB #2 associated a second beam direction to UE 103.

Figure 2:
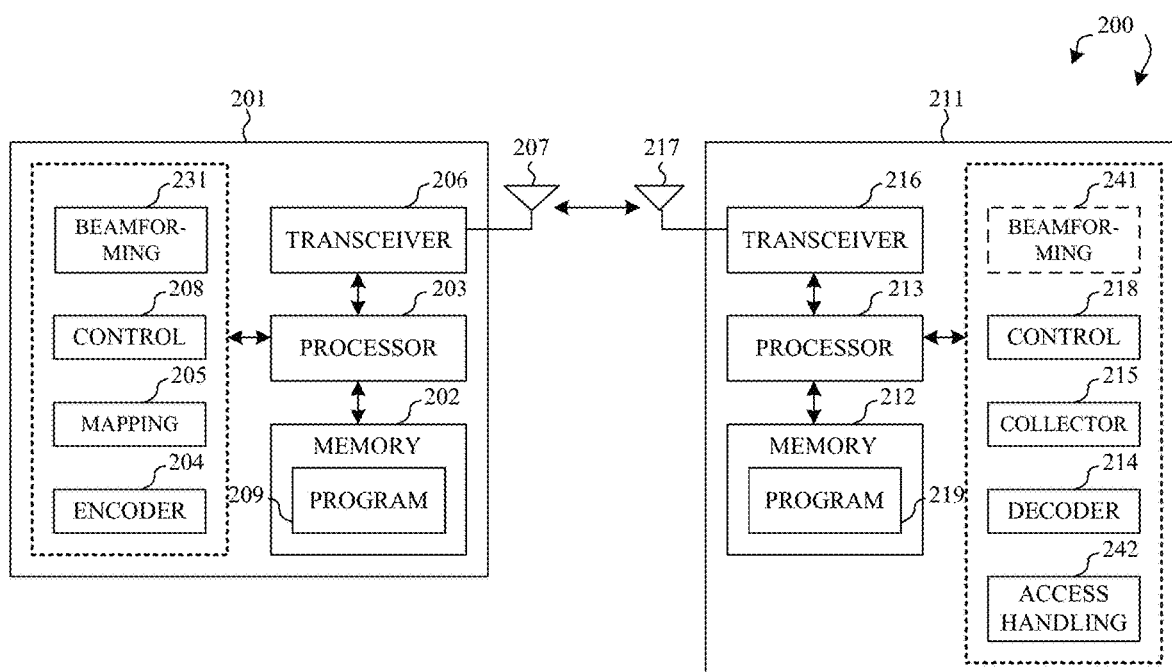
FIG. 2 illustrates simplified block diagrams of a base station and a user equipment in accordance with embodiments of the present invention.

FIG. 2 illustrates simplified block diagrams of a base station 201 and a user equipment 211 in accordance with embodiments of the present invention. For base station 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in base station 201. Memory 202 stores program instructions and data 209 to control the operations of the base station.

Similar configuration exists in UE 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in UE 211. Memory 212 stores program instructions and data 219 to control the operations of the UE.

The base station 201 and UE 211 also include several functional modules and circuits to carry out some embodiments of the present invention. The different functional modules and circuits can be implemented by software, firmware, hardware, or any combination thereof. In one example, each function module or circuit comprises a processor together with corresponding program codes. The function modules and circuits, when executed by the processors 203 and 213 (e.g., via executing program codes 209 and 219), for example, allow base station 201 to encode and transmit downlink control information to UE 211, and allow UE 211 to receive and decode the downlink control information accordingly.

In one embodiment, base station 201 configures a set of radio resource for PDCCH transmission via control module 208 and maps the downlink control information to the configured REGs via mapping module 205. The downlink control information carried in PDCCH is then modulated and encoded via encoder 204 to be transmitted by transceiver 206 via antenna 207, through beamforming circuit 231, which may belong to part of the RF module 206. UE 211 receives the downlink control information by transceiver 216 via antenna 217. Optionally, UE 211 can perform beamforming via beamforming circuit 241, which may belong to part of the RF module 216. UE 211 determines the configured radio resource for PDCCH transmission via control module 218 and collects the configured REGs via collector 215. UE 211 then demodulates and decodes the downlink information from the collected REGs via decoder 214. Upon successfully decoding the downlink control information and PDCCH, UE 211 can determine its favored UE analog beam direction and PRACH resource and perform channel access via channel access handling circuit 242.

The design of PDCCH resource allocation is decomposed into two steps. First, base station maps a plurality of REGs to each CCE based on an REG-to-CCE mapping rule. A physical unit of resource element groups (REGs) are indexed, where the group of REs is predefined for each REG. A logical unit of control channel elements (CCEs) are created, where the group of REGs is predefined or configured by higher layer for each CCE. The REG indexing can be done by a frequency first manner, or by a time first manner over the CORESET. The REG-to-CCE mapping can be distributed or localized. Second, CCE-to-PDCCH-candidate mapping is defined in the search space. For distributed transmission of PDCCH, CCE consists of several REGs that are distributed in multiple non-contiguous PRBs spreading over the whole channel frequency so that frequency diversity gain can be maximally exploited using distributed CCE structure. For localized transmission of PDCCH, CCE consists of several REGs that are uniformly distributed in single PRB so that it facilitates uniform utilization of reference signals inside one PRB for better robustness in channel estimation.

Figures 3A, 3B, 3C, 3D:
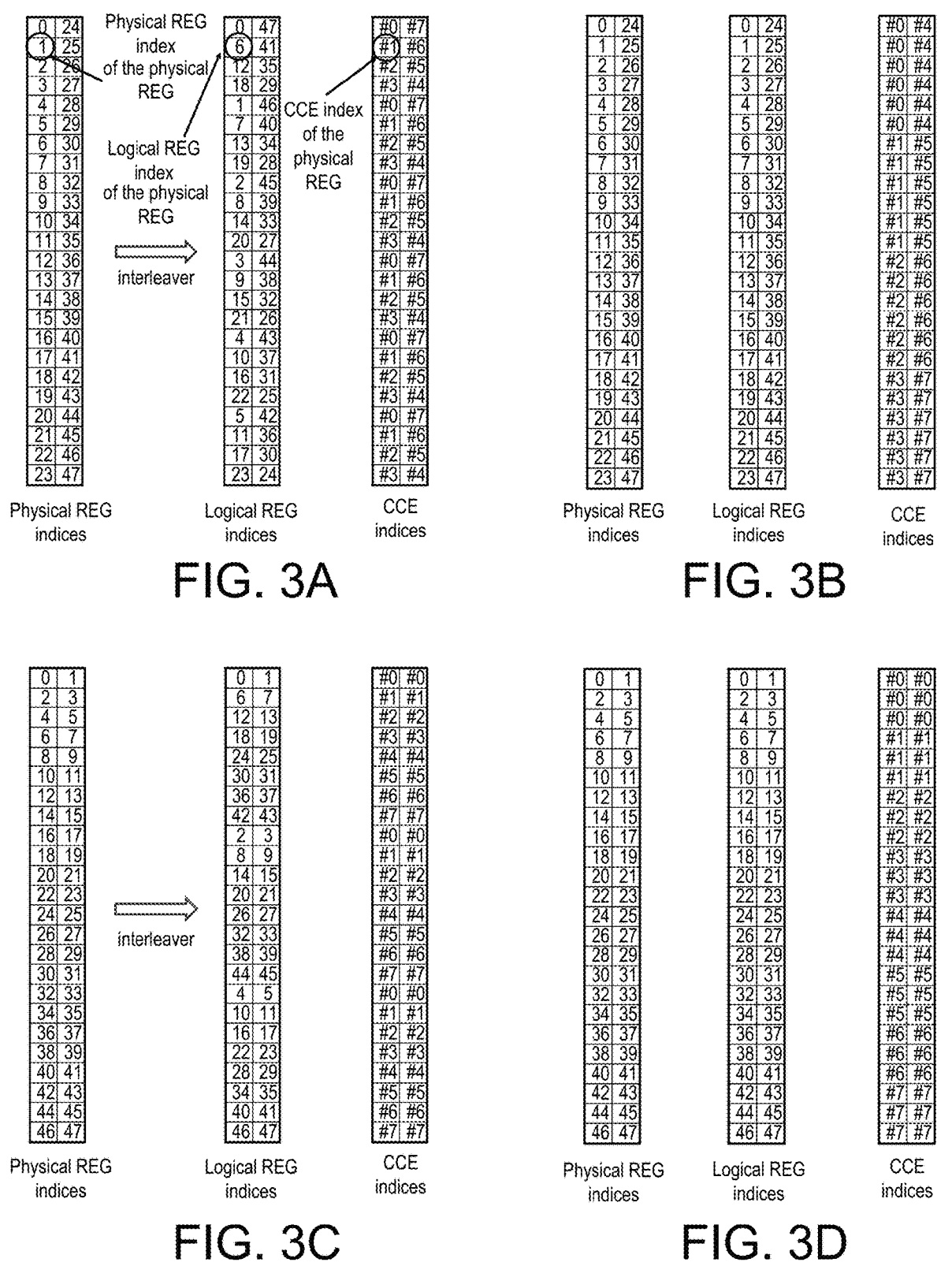

FIG. 3A illustrates a first embodiment of PDCCH structure with frequency first REG indexing and distributed REG to CCE mapping. In the example of FIG. 3A, each unit block represents an REG. The CORESET has 24 PRBs in frequency domain and two OFDM symbols in time domain. One CCE has six REGs. The physical REGs are labeled with the physical REG indices. Since the mapping is frequency first, the REG indexing follows the frequency first manner. For each REG, the physical REG index is transformed to the logical REG index. The transformation is done by an interleaver. The purpose of the interleaver is to enable distributed mapping within a CCE. The range of the interleaver is the whole CORESET both in the frequency and time domains. Interleaved REGs are then grouped into CCEs according to the logical indices. For example, the REGs with logical indices 0 to 5 are grouped to form CCE #0, and the REGs with logical indices 6 to 11 are grouped to form CCE #1. Such distributed REG-to-CCE mapping is used together with frequency first REG indexing to gain frequency diversity gain, e.g., the physical REGs of one CCE are located separately in different subcarriers in frequency domain.

FIG. 3B illustrates a second embodiment of PDCCH structure with frequency first REG indexing and localized REG to CCE mapping. In the example of FIG. 3B, each unit block represents an REG. The CORESET has 24 PRBs in frequency domain and two OFDM symbols in time domain. One CCE has six REGs. The physical REGs are labeled with the physical REG indices. Since the mapping is frequency first, the REG indexing follows the frequency first manner. No interleaver is needed. REGs are then grouped into CCEs according to the logical indices. For example, the REGs with logical indices 0 to 5 are grouped to form CCE #0, and the REGs with logical indices 6 to 11 are grouped to form CCE #1. Such localized REG-to-CCE mapping is used together with frequency first REG indexing to reduce latency of PDCCH processing, e.g., the physical REGs of one CCE are located within one OFDM symbol.

FIG. 3C illustrates a third embodiment of PDCCH structure with time first REG indexing and distributed REG to CCE mapping. In the example of FIG. 3C, each unit block represents an REG. The CORESET has 24 PRBs in frequency domain and two OFDM symbols in time domain. One CCE has six REGs. The physical REGs are labeled with the physical REG indices. Since the mapping is time first, the REG indexing follows the time first manner. For each REG, the physical REG index is transformed to the logical REG index. The transformation is done by an interleaver. The purpose of the interleaver is to enable distributed mapping within a CCE. The range of the interleaver is the whole CORESET both in the frequency and time domains. REGs are then grouped into CCEs according to the logical indices. For example, the REGs with logical indices 0 to 5 are grouped to form CCE #0, and the REGs with logical indices 6 to 11 are grouped to form CCE #1.

FIG. 3D illustrates a fourth embodiment of PDCCH structure with time first REG indexing and localized REG to CCE mapping. In the example of FIG. 3D, each unit block represents an REG. The CORESET has 24 PRBs in frequency domain and two OFDM symbols in time domain. One CCE has six REGs. The physical REGs are labeled with the physical REG indices. Since the mapping is time first, the REG indexing follows the time first manner. No interleaver is needed. REGs are then grouped into CCEs according to the logical indices. For example, the REGs with logical indices 0 to 5 are grouped to form CCE #0, and the REGs with logical indices 6 to 11 are grouped to form CCE #1. Such localized REG-to-CCE mapping is used together with time first REG indexing to improve frequency selectivity gain, e.g., the physical REGs of one CCE are located within nearby subcarriers.

Figure 4:
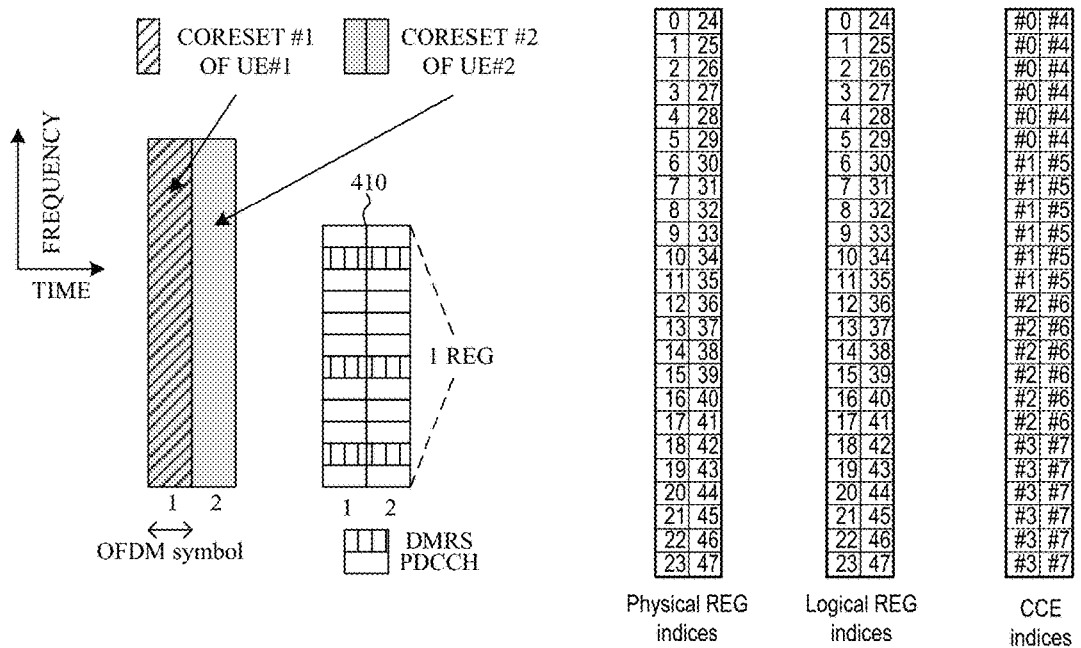
FIG. 4 illustrates CORESET and search space configured for different UEs in accordance with one novel aspect of the present invention.

FIG. 4 illustrates CORESET and search space configured for different UEs in accordance with one novel aspect of the present invention. A UE receives the configuration of a default CORESET in MIB (master information block) or in SIB (system information block). The CORESET configuration comprises the set of PRBs in frequency domain and the set of OFDM symbols in time domain. In addition, the CORESET configuration comprises the numerology of the radio resource grid, the periodicity of control signal, and RS (reference signal) configuration. In one example, as depicted by 410 of FIG. 4, one REG contains 12 resource elements (REs) along frequency domain and occupies one OFDM symbol, and reference signals (e.g., DMRS(s)) are self-contained in the REG(s). A default CORESET contains both common search space and UE-specific search space. A PDCCH in a default CORESET is mapped to physical resource in a distributed manner, e.g., REG-to-CCE mapping is distributed. This is because the PDCCH may be targeted to all UEs in a cell and frequency diversity is desired. The physical resource of a default CORESET can be either contiguous or non-contiguous in frequency domain. A default CORESET may not appear in every slot. This is because paging and system information appears periodically, and random-access response appears within a window of PRACH resource.

A UE can be additionally configured by higher layer with additional CORESET(s) after its C-RNTI (radio network temporary identifier) is available. Similar to the default CORESET, the addition CORESET configuration comprises the numerology of the radio resource grid, the periodicity of control signal, and RS (reference signal) configuration. An additional CORESET typically contains UE-specific search space since it is targeted to the UE. The REG-to-CCE mapping of a PDCCH in an additional CORESET is either localized or distributed. A default CORESET and an additional CORESET can overlap in time and/or frequency domain for a UE. Properties of a default CORESET and an additional CORESET can be different, e.g., physical resource allocation (time first or frequency first; localized or distributed), transmission scheme, RS pattern, PRB bundling size, etc. There are two types of PDCCHs, i.e., broadcast/multicast PDCCH and unicast PDCCH. Broadcast/multicast PDCCH and unicast PDCCH should have different REG-to-PDCCH-candidate mapping, i.e., time first or frequency first, localized or distributed. Therefore, REG-to-PDCCH-candidate mapping is a parameter of search space, not a parameter of CORESET.

In the example of FIG. 4, consider a PDCCH structure with frequency first REG indexing and localized REG-to-CCE mapping. A serving base station configures CORESET #1 for UE #1 and CORESET #2 for UE #2. Assume the CORESET duration of UE #1 is OFDM symbol 1, and the CORESET duration of UE #2 is OFDM symbols 1 and 2. When a CORESET contains an integer multiple number of CCEs in the frequency domain, e.g., four CCEs, the CCEs of UE #1 and the CCEs of UE #2 are aligned in the second OFDM symbol. In this way, the blocking rate of PDCCH scheduling is lower. Therefore, in frequency domain, a CORESET contains an integer number of CCEs.

Figure 5:
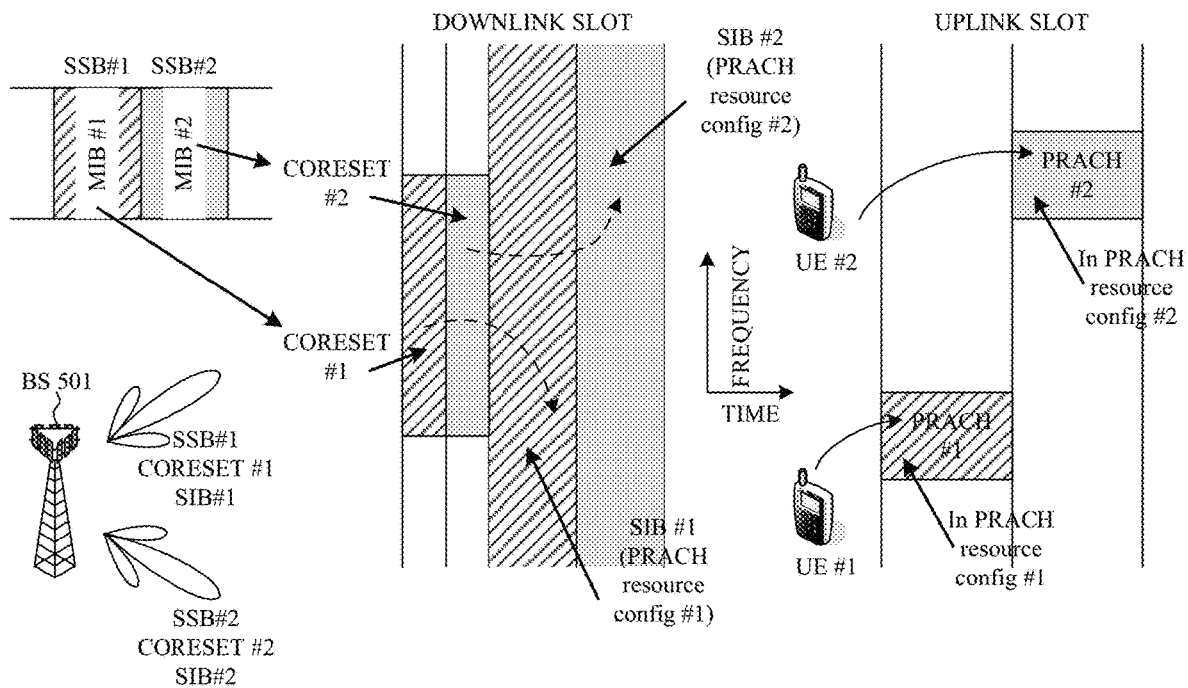
FIG. 5 illustrates the support of analog beamforming in PDCCH design.

FIG. 5 illustrates the support of analog beamforming in PDCCH design. When a UE powers on, it begins the cell search and chooses a proper cell to perform the following behaviors. First, the UE reads the MIB in a synchronization signal block (SS Block), where the MIB contains the configuration of the default CORESET. Second, the UE reads the DCI of the essential SIB in the default CORESET. The DCI is delivered by the PDCCH in the common search space contained in the default CORESET. The essential SIB is delivered by the PDSCH, which carries the configuration of the PRACH resource. Third, the UE performs random access based on the PRACH resource configuration to enter RRC Connected mode and obtains the C-RNTI. Fourth, after entering the RRC Connected mode, the UE can be signaled be dedicated RRC about the configuration of additional CORESET(s).

When analog beamforming is used, it is required to take the beam management procedure into account for the above behaviors. For example, in mmWave systems, control beams associated with different beamforming weights are defined for periodically broadcasting control information to all UEs in a cell. As illustrated in FIG. 5, assume there are two DL TX analog beam directions. BS 501 transmits SS block #1, default CORESET #1, and SIB #1 via the first DL TX analog beam direction. BS 501 transmits SS block #2, default CORESET #2, and SIB #2 via the second DL TX analog beam direction. For UE #1 that prefers the first DL TX analog beam direction in the cell search procedure, UE #1 reads MIB #1 and obtains the configuration of the default CORESET #1 in SS Block #1. For UE #2 that prefers the second DL TX analog beam direction in the cell search procedure, UE #2 reads MIB #2 and obtains the configuration of the default CORESET #2 in SS Block #2. Via SIB #1, UE #1 knows the resource configuration #1 of the PRACH resource and transmits the PRACH preamble based on PRACH #1 resource. Via SIB #2, UE #2 knows the resource configuration #2 of the PRACH resource and transmits the PRACH preamble based on PRACH #2 resource.

The network knows which analog beam direction the UE favors (or which default CORESET(s) the UE is monitoring) from the PRACH resource adopted by the UE. The random-access response (RAR) is transmitted with the DL TX analog beam direction which the UE prefers. To transmit unicast PDCCH, the network needs to know the analog beam direction the UE prefers. Broadcast or multicast PDCCHs are transmitted in the default CORESETs of all analog beam directions. A UE can be additionally configured by higher layer with additional CORESET(s) after its C-RNTI is available. The starting symbol of PDSCH can be carried in unicasts PDCCH transmission, since PDSCH may not appear right after the CORESET.

For coordinated multiple point (COMP) transmission, when different TRPs (transmission points) use the same cell ID, UE cannot differentiate the SS blocks sent from the different TRPs. Downlink COMP can be performed by multiple TRPs or by multiple transmit beam directions in mmWave systems. A transmit beam direction may be an aggregation of transmit beams of multiple TRPs. For each transmit beam, UE knows which receive beam should be used by means of beam management procedure or CSI (channel state information) measurement procedure. UE can differentiate the signals from different TRPs (or a group of TRPs) if each TRP (or each group of TRPs) uses a distinct DMRS sequence for PDCCH. For MU-MIMO transmission, PDCCHs intended to different UEs can be transmitted by MU-MIMO. The PDCCHs may be from different TRP groups. The PDCCHs may be from the same TRP group. The PDCCHs may have different beam directions.

Figure 6:
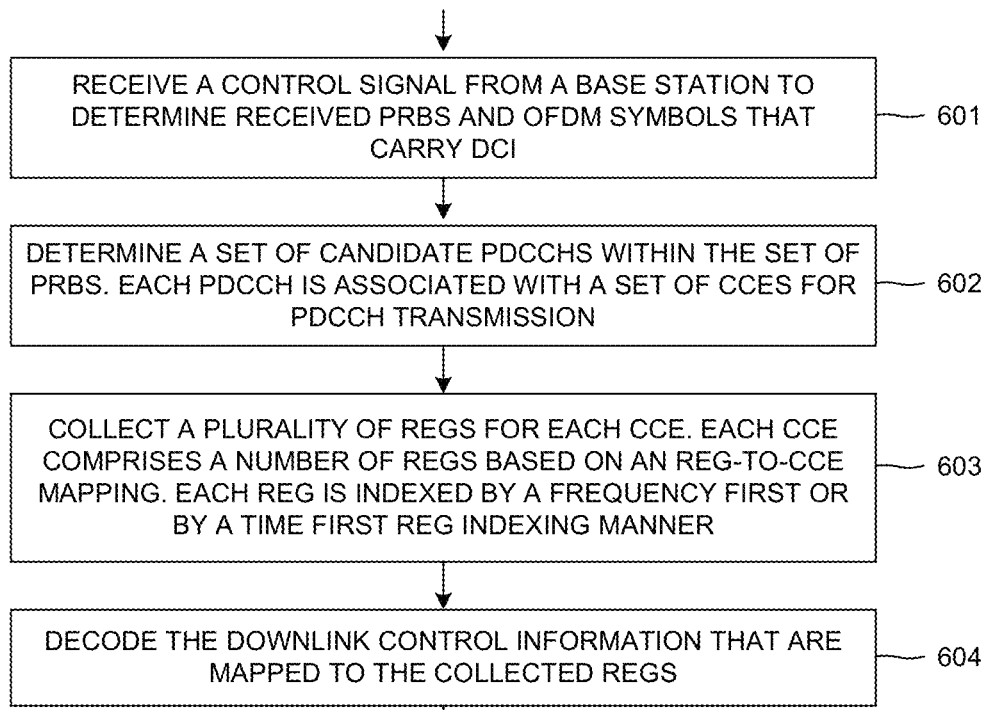
FIG. 6 is a flow chart of a method PDCCH structure in accordance with one novel aspect.

FIG. 6 is a flow chart of a method PDCCH structure in accordance with one novel aspect. In step 601, a UE receives a control signal from a base station to determine a set of received physical resource blocks (PRBs) and a set of OFDM symbols that carry downlink control information. In step 602, the UE determines a set of candidate physical downlink control channels (PDCCHs) within the set of PRBs. Each PDCCH is associated with a set of control channel elements (CCEs) for PDCCH transmission. In step 603, the UE collects a plurality of resource element groups (REGs) for each CCE. Each CCE consists of a number of REGs based on a REG-to-CCE mapping, and each REG is indexed by a frequency first or by a time first REG indexing manner. In step 604, the UE decodes the downlink control information that are mapped to the collected REGs.

Figure 7:
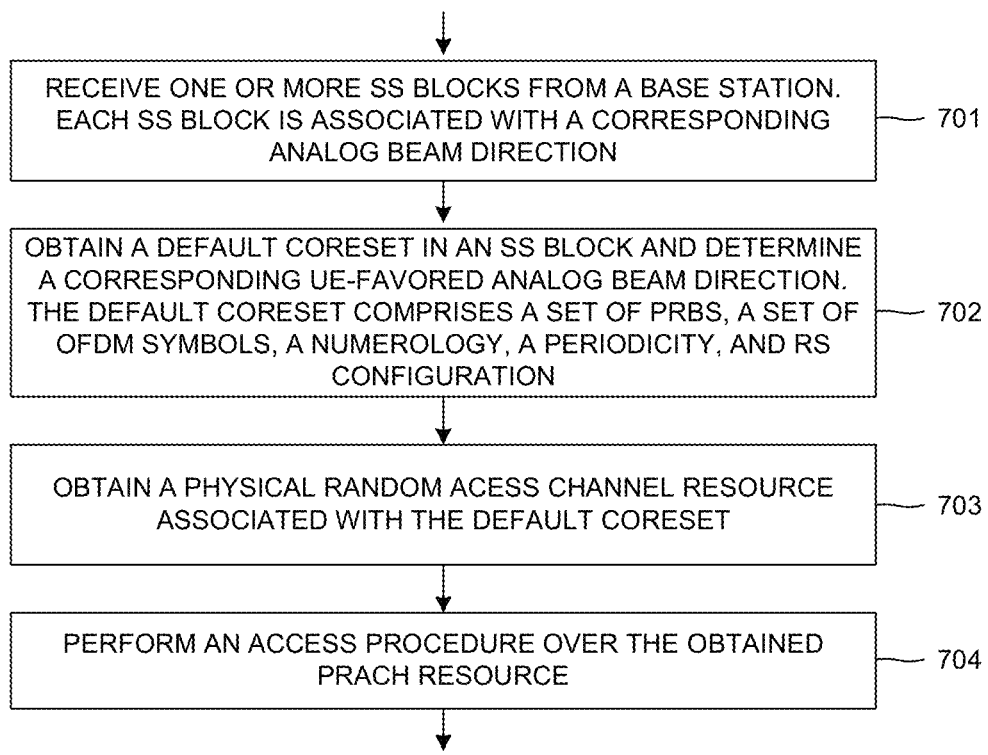
FIG. 7 is a flow chart of a method of PDCCH transmission with analog beamforming in accordance with one novel aspect.

FIG. 7 is a flow chart of a method of PDCCH transmission with analog beamforming in accordance with one novel aspect. In step 701, a UE receives one or more synchronization signal blocks (SS Blocks) from a base station. Each SS block is associated with a corresponding analog beam direction. In step 702, the UE obtains a default control resource set (CORESET) in an SS block and determining a corresponding UE-favored analog beam direction. The default CORESET comprises a set of physical resource blocks (PRBs), a set of OFDM symbols, a numerology, a periodicity, and reference signal (RS) configuration. In step 703, the UE obtains a physical random-access channel (PRACH) resource associated with the default CORESET. In step 704, the UE performs an access procedure over the obtained PRACH resource.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving one or more synchronization signal blocks (SS Blocks) from a base station by a user equipment (UE), wherein each SS block is associated with a corresponding analog beam direction;
   obtaining a default control resource set (CORESET) in an SS block and determining a corresponding UE-favored analog beam direction, wherein the default CORESET comprises a set of physical resource blocks (PRBs), a set of OFDM symbols, a numerology, a periodicity, and reference signal (RS) configuration;
   obtaining a physical random-access channel (PRACH) resource associated with the default CORESET; and
   performing an access procedure over the obtained PRACH resources; and
   receiving an additional CORESET over a higher layer signaling after the UE obtains a UE ID from the base station.

2. The method of claim 1, wherein the default CORESET contains both a common search space and a UE-specific search space for physical downlink control channel (PDCCH) transmission.

3. The method of claim 2, wherein the UE receives a broadcast or multicast PDCCH transmitted in the default CORESET of all analog beam directions.

4. The method of claim 1, wherein the UE receives a unicast PDCCH transmitted in the additional CORESET using the UE-favored analog beam direction.

5. The method of claim 1, wherein each PDCCH is associated with a set of control channel elements (CCEs), and wherein the additional CORESET and the default CORESET contain an integer multiple number of CCEs in the frequency domain.

6. A user equipment (UE) comprising:
   a radio frequency (RF) receiver that receives one or more synchronization signal blocks (SS Blocks) from a base station, wherein each SS block is associated with a corresponding analog beam direction;
   a control circuit that obtains a default control resource set (CORESET) in an SS block and determining a corresponding UE-favored analog beam direction, wherein the default CORESET comprises a set of physical resource blocks (PRBs), a set of OFDM symbols, a numerology, a periodicity, and reference signal (RS) configuration; and
   a channel access handling circuit that obtains a physical random-access channel (PRACH) resource associated with the default CORESET and performs an access procedure over the obtained PRACH resource, wherein the UE receives an additional CORESET over a higher layer signaling after the UE obtains a UE ID from the base station.

7. The UE of claim 6, wherein the default CORESET contains both a common search space and a UE-specific search space for physical downlink control channel (PDCCH) transmission.

8. The UE of claim 7, wherein the UE receives a broadcast or multicast PDCCH transmitted in the default CORESET of all analog beam directions.

9. The UE of claim 6, wherein the UE receives a unicast PDCCH transmitted in the additional CORESET using the UE-favored analog beam direction.

10. The UE of claim 6, wherein each PDCCH is associated with a set of control channel elements (CCEs), and wherein the additional CORESET and the default CORESET contain an integer multiple number of CCEs in the frequency domain.

* * * * *